Jan. 13, 1970

H. GRIGULL 3,489,830

PREPARATORY TREATMENT AND PROCESSING OF
PLASTIC AND RUBBER MATERIALS

Filed July 5, 1966

INVENTOR
Hans Grigull

BY Spencer & Kaye
ATTORNEYS

Jan. 13, 1970   H. GRIGULL   3,489,830
PREPARATORY TREATMENT AND PROCESSING OF
PLASTIC AND RUBBER MATERIALS
Filed July 5, 1966   2 Sheets-Sheet 2

INVENTOR
Hans Grigull
BY Spencer & Kaye
ATTORNEYS

United States Patent Office 3,489,830
Patented Jan. 13, 1970

3,489,830
PREPARATORY TREATMENT AND PROCESSING OF PLASTIC AND RUBBER MATERIALS
Hans Grigull, 31 Forsterstrasse,
Cologne-Ehrenfeld, Germany
Filed July 5, 1966, Ser. No. 562,703
Claims priority, application Austria, Jan. 7, 1966,
A 154/66
Int. Cl. B29b 1/06, 3/02
U.S. Cl. 264—102                                                6 Claims

ABSTRACT OF THE DISCLOSURE

A method and apparatus for preparing various types of plastic materials so as to compress such materials and to give them a low water content, by subjecting such material to a strong vacuum while causing it to progress, in an extruder, firstly through a heating zone where it is heated to a temperature which is at least 10% greater than its melting temperature and secondly through a cooling zone where it is cooled to a temperature of approximately 80% of its melting temperature, the material being compressed and extruded after having been so cooled.

---

The present invention relates to a method for the preparatory treatment and processing of thermoplastic and duroplastic materials and/or rubber and/or similar materials in suitable machines known per se having a charging hopper and an extruder under underpressure, said extruder having associated therewith several independently controllable heating and/or cooling zones.

The designation "plastic material" in this specification and in the claims covers all thermoplastic and duroplastic materials and rubber as well as equivalent materials. For the sake of simplicity the collective term "plastic material" is used here.

When processing plastic materials it is required, for attaining a good homogeneous plastic mass, that the temperature of the preparatory treatment be as close as possible to the melting point of the material. To prevent the formation of air bubbles and shrink holes, it is known to use evacuable charging hoppers which, however, generally cause a more nonuniform flow of material at normal processing temperatures. To remedy this shortcoming, there are employed filler screws or other devices, which forcibly feed the material to the processing screws. The cause of the different filling factor is the partial evacuation of the material. The gas outbursts which occur have the effect of causing the material to be forced back toward the charging hopper in a pulse-like manner.

It is an object of the present invention to provide an economical method and device which avoid the disadvantages resulting from a nonuniform flow rate of such granulated material into the extruder. Further, by achieving a more uniform charging of the extruder with homogeneously degassed material, the quality of the product will be improved considerably. Finally, it is an object of the present application to improve the capacity of existing machines by employing suitable measures which as much as double their output capacity.

Additional objects and advantages of the present invention will become apparent upon consideration of the following description when taken in conjunction with the accompanying drawings in which.

To obtain useful results when employing the hitherto known methods, for instance in the processing of hard P.V.C. it is desirable to achieve and maintain a temperature of 140° C. in a first zone, of 160° C. in a second zone, and of 175° C. in a third zone. Since the plastic material is a poor heat conductor, if the first zone is subjected to a cylinder temperature of 140° C. the material will be heated at the most up to 100° C. In the second zone, with a cylinder temperature of 160° C. a temperature of approximately 120° C. will be attained, and in the third zone temperatures will amount to from 140° to 150° C. At this temperature, however, violent gas outbursts occur which are so voluminous that the material will be blown back in a direction towards the charging hopper. According to the present invention, in the individual heating zones the temperature is adjusted such that the partial evacuation of the plastic material, due to physical phenomena for example, takes place within the first heating zone and thus, does not influence the feeding capacity intermittent manner, and therefore allows only fully degassed plastic materials to pass into the plastification zones and further feeding zones of the extruder.

Figure 1:
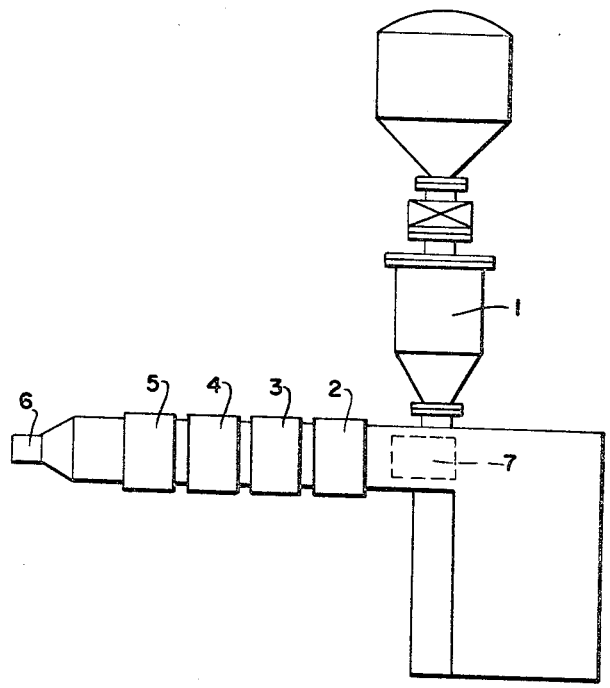
FIGURE 1 is an elevational view of one arrangement according to the present invention.
Figure 3:
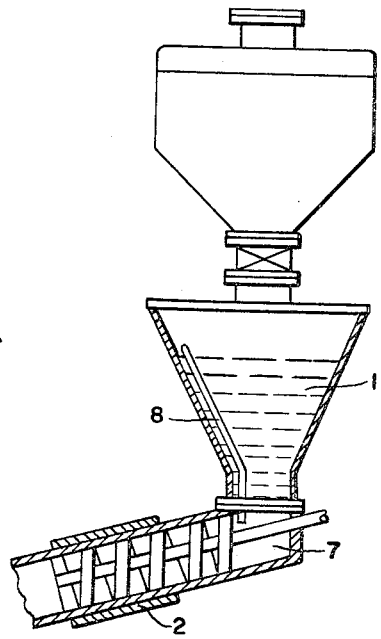
FIGURE 3 is an elevational, cross-sectional view of a portion of the arrangement of FIGURE 1.
Figure 4:
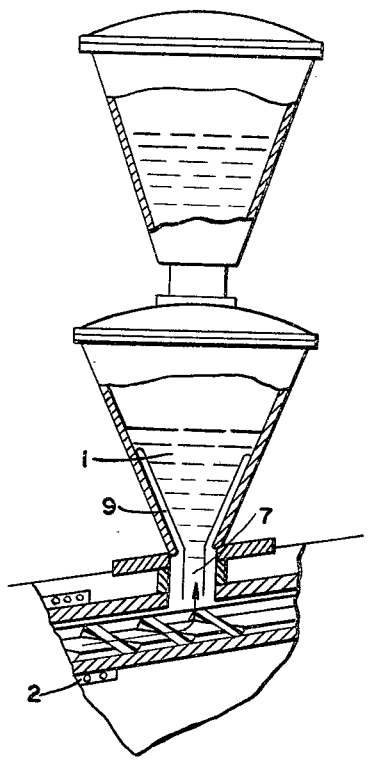
FIGURE 4 is an elevational, cross-sectional view of another form of construction of the structure of FIGURE 3.

In accordance with the present invention, by evacuating the hopper system as well as the extruder entry zone to a low pressure of below 10 mm. Hg, the oxygen content is reduced in accordance with the pressure. Further, under the influence of this vacuum and of the temperature, the water content is reduced to such an extent that at higher temperatures there will be no thermal decomposition. According to the prior art it was, for instance, not possible to process hard P.V.C. at temperatures of above +175° C. without the material being thermally decomposed and/or burnt. However, the present invention makes it possible, by removing the oxygen, to operate at substantially higher temperatures since there is no longer any danger that burning and decomposition, for example will occur. By evacuating the hopper and extruder, an outgassing temperature of from 140° to 145° C. will be attained in the first zone by the application of a suitable high temperature which has the effect of preventing the occurrence of feed variations. In contrast to the previously known techniques, wherein the temperature is built up slowly, according to the present invention, as is schematically illustrated in the drawing according to FIG. 1, the material is already degassed in hopper 1 so that the hitherto admissible maximum temperatures can already be attained within the first zone 2—the amounts of gas accumulating therein being continuously sucked off from chamber 7. The temperature to which the material is subjected can be subsequently increased further in the heating zones 3, 4—the maximum temperature attained being at least 10% greater than the hitherto known maximum processing temperature. The drawing off of the amounts of gas accumulating in chamber 7 is suitably accomplished by a suction device composed of one or several suction pipes 8, as shown in FIG. 3, or a double jacket 9, as shown in FIG. 4, in the charging hopper bottom portion, the suction device terminating within the extruder at a point about 5 mm. above the periphery of the screw.

However, for successfully carrying out the method as indicated, it is further necessary that, for attaining a good feeding capacity, zone 5 be cooled very effectively so that a good pressure buildup can be produced in the screw up to the outlet 6 of the extruder. The creation of higher temperatures in zones 2–4 results in a lower viscosity of the material and thus a better homogeneity, as well as in improved melting of constituents having higher melting temperatures. This enables the total capacity of the machine to be almost doubled at no added cost, particularly for the drive power, with a simultaneous reduction in the customary waste to a low value.

Figure 2:
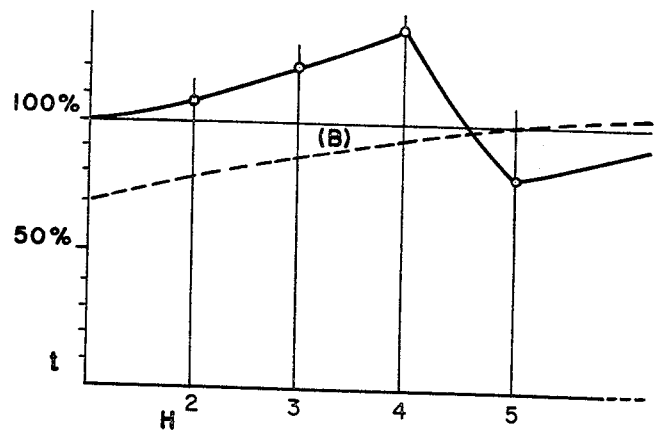
FIGURE 2 is a diagram used in explaining the present invention.

The method according to the invention is illustrated in the diagram of FIG. 2 wherein the temperature $t$ in each heating zone (H) is shown with respect to the normal melting temperature—for instance, 100%=175° C.—by the solid line. The broken line (B) illustrates the comparable values achieved by the hitherto known processing technique.

The invention shall now be explained in terms of a specific example. By way of example, when polyvinyl chloride (hard) is processed, the normal plastification temperature is +175° C. According to the method of the invention, a temperature of 193° C. is applied to the first heating zone 2, a temperature of up to 200° C. is applied to the following zone 3 up to 235° C. is applied to the following zone 3 up to 235° C. is applied to the third heating zone 4. After the third heating zone, the temperature is reduced again to the hitherto known values. The above-mentioned temperatures are those of the heating cylinders or jackets, while the actual temperatures of the material can be taken from the diagram of FIGURE 2.

It should of course be appreciated that for successfully carrying out the method of the present invention on plastic materials having other compositions, the temperatures of the preparatory treatment must be adjusted accordingly.

The products made from plastic material treated in accordance with the present invention are marked by a low water content. This water content has been reduced to the hitherto unattainable value of 0.1%, the product being at the same time free of outwardly adhering monomers.

The invention is claimed as follows:

1. A method for the preparatory treatment and processing of thermoplastic materials, duroplastic materials, rubber, and the like, in an extruder, comprising the steps of:
   (a) introducing such material into such extruder through an inlet thereof;
   (b) maintaining a vacuum constituted by a pressure of no greater than 10 mm. Hg at least within the inlet region of such extruder; and
   (c) carrying such material through such extruder while heating it in a first heating zone which is in communication with such inlet and which is at a temperature at least 10% greater than the melting temperature of such material, and subsequently cooling such material in a succeeding cooling zone to a temperature below its melting temperature.

2. A method as defined in claim 1 comprising the further step of degassing such material by drawing the gas liberated therefrom in the first heating zone through such inlet.

3. A method as defined in claim 1 wherein said heating and cooling are carried out in at least three zones including at least one heating zone and at least one cooling zone.

4. A method as defined in claim 1 wherein said step of carrying includes further heating such material in a second heating zone which is at a temperature at least 20% greater than the melting temperature of such material and which is disposed between the first heating zone and the cooling zone.

5. A method as defined in claim 4 wherein said step of carrying additionally includes further heating the material in a third heating zone which is at a temperature at least 30% greater than the melting temperature of such material and which is disposed between the second heating zone and the cooling zone.

6. A method as defined in claim 1 wherein said cooling step cools such material to a temperature of the order of 80% of its melting temperature.

References Cited

UNITED STATES PATENTS

| | | | |
|---|---|---|---|
| 1,156,096 | 10/1915 | Price. | |
| 1,898,381 | 11/1932 | Mooney | 264—176 |
| 3,067,462 | 12/1962 | Kullgren | 264—102 |
| 2,749,590 | 6/1956 | Kilpatrick | 264—102 |
| 3,036,335 | 5/1962 | Heston et al. | 264—102 |

ROBERT F. WHITE, Primary Examiner

JEFFERY R. THURLOW, Assistant Examiner

U.S. Cl. X.R.

18—12; 264—176